A. E. DETWILER.
AUXILIARY MIXING ATTACHMENT FOR CARBURETERS.
APPLICATION FILED FEB. 21, 1918.
1,285,068.
Patented Nov. 19, 1918.
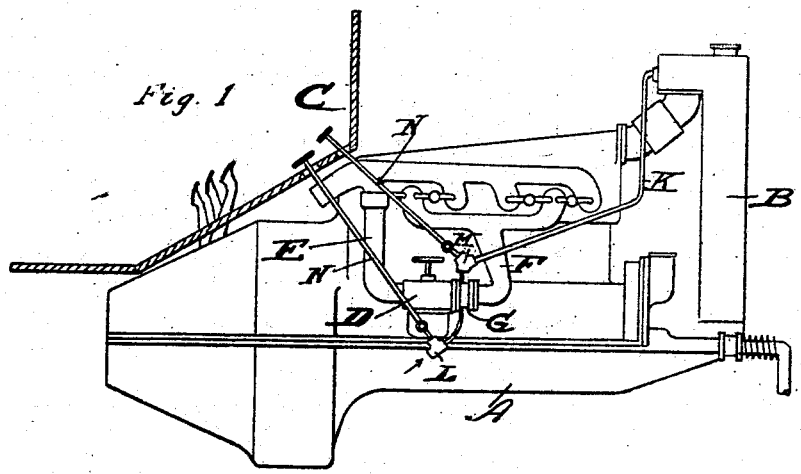
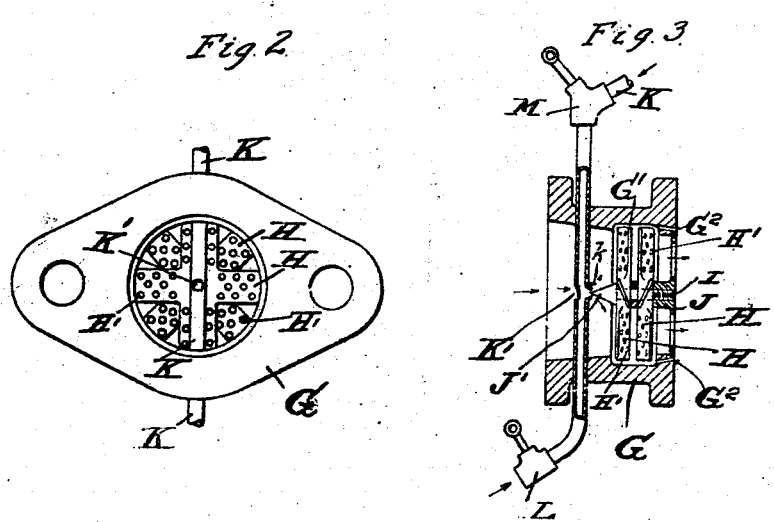
Inventor
Angus E. Detwiler
By S. E. Thomas
Attorney

UNITED STATES PATENT OFFICE.

ANGUS E. DETWILER, OF OXFORD, MICHIGAN.

AUXILIARY MIXING ATTACHMENT FOR CARBURETERS.

1,285,068.

Specification of Letters Patent.

Patented Nov. 19, 1918.

Application filed February 21, 1918. Serial No. 218,423.

*To all whom it may concern:*

Be it known that I, ANGUS E. DETWILER, a citizen of the United States, residing at Oxford, county of Oakland, State of Michigan, have invented a certain new and useful Improvement in Auxiliary Mixing Attachments for Carbureters, and declare the following to be a full, clear, and exact description of the same, such as will enable others skilled in the art to which it pertains to make and use the same, reference being had to the accompanying drawings, which form a part of this specification.

My invention relates to an auxiliary mixing attachment for carbureters, shown in the accompanying drawings in connection with the internal combustion engine of a motor vehicle, and particularly described in the following specifications and claims:

The object of this invention is to increase the efficiency of an internal combustion engine by providing a simple and inexpensive device located in the pipe line between the carbureter and the inlet manifold, having a plurality of revoluble fan blades adapted to be actuated through the suction stroke of the engine, that a better combustible mixture may be obtained of liquid fuel, air, and of moistened vapor, delivered thereto from the radiator;—and whereby kerosene, or a low grade gasolene may be used as the fuel.

With the foregoing and other objects in view which will appear as the description proceeds, the invention resides in the combination and arrangement of parts and in the details of construction hereinafter described and claimed, it being understood that changes may be made in the precise embodiment of the invention herein disclosed without departing from the spirit of the same.

In the accompanying drawings,

Figure 1 is a side elevation of the power plant of a motor driven vehicle, showing the carbureter; the device embodying this invention installed in line therewith; a pipe connection between said device and the radiator, and an air inlet pipe, controlled by valves operable from the dash of a vehicle, a fragment of which is shown.

Fig. 2 is a front elevation of the device.

Fig. 3 is a cross-sectional view on line 3—3 of Fig. 2, showing also a portion of the pipe connection leading to the radiator; the air inlet pipe, and the valves controlling the passage through the respective pipes.

Referring now to the letters of reference placed upon the drawings:—A, denotes an internal combustion engine. B, the radiator for its water circulating system. C, denotes the dash of a motor vehicle.

D, designates the carbureter. E, indicates the air inlet pipe leading to the carbureter and F, the pipe leading to the inlet manifold. Located between the carbureter and the pipe F, and in line therewith is a fitting G, through which the gas passes on the way to the combustion chamber of the engine. H, H, indicates a pair of rotatable fans, loosely mounted on a stub shaft I, projecting from a cross bar J, which bridges the opening through the fitting G.

The blades of the respective fans are inclined in opposite directions in order that when actuated through the suction stroke of the engine they may rotate in opposite directions.

H', denotes a series of perforations through the fan blades the purpose of which is to aid in securing a more perfect mixture of the combustible gases. The central opening through the fitting G, tapers in a nozzle-like form from the side of the fitting adjacent to the carbureter toward the fan blades;—the outer ends of the fan blades projecting into an enlarged chamber G', at the contracted end of the tapered opening, from which extend inclined apertures $G^2$, opening into the pipe leading to the inlet manifold to relieve the pressure produced by the fan in the enlarged chamber G'.

K, denotes a pipe leading from the radiator B, above its water level, to the fitting G, bridging the opening in the fitting between the carbureter and the fans H, H. K', is a transverse opening through the pipe K, in line with the tapering end I', of the stub shaft I, on which the fans are mounted.

The wall of the pipe K, is slightly burred as indicated at $k$, surrounding the discharge opening K', forming a sort of nozzle which coacts with the tapering end J', of the stub shaft to produce a spraying effect. The pipe K, extends through the fitting G, to the under side of the latter where it is provided with a valve L, to control the admission of air through the pipe to the fitting. M, denotes a valve in the pipe K, above the fitting controlling the delivery of moistened vapor from the radiator. The valves L, and M, are each fitted with a rod or handle N, to facilitate their manual operation from the driver's seat.

Having indicated the several parts by reference letters the construction and operation of the device will be readily understood.

The combustible mixture drawn from the carbureter is caused to thoroughly commingle in its passage to the combustion chamber with the air and the moistened vapor, drawn through the pipe K, due to the action of the oppositely moving perforated fan blades rotated by the suction stroke of the engine.

By a proper adjustment of the valves L, and M, a mixture may be secured that will insure complete combustion of the gas upon delivery to the engine, thereby increasing the efficiency of the latter.

Having thus described my invention what I claim is:—

1. In a device of the class described, a fitting adapted to be located in the pipe line between the carbureter and the intake manifold of a gas engine, a water cooling system for the engine, a chamber in said fitting, a pipe line connecting the water cooling system and the fitting for the supply of moistened vapor to the fitting, an air inlet to said fitting, and a fan in said chamber, said fitting having converging apertures leading through the fitting from said chamber into said pipe line to relieve pressure in the chamber.

2. In a device of the character described, a fitting open at opposite ends and adapted to be located in the pipe line between the carbureter and the intake manifold of a gas engine, a chamber in the fitting, a fan in the chamber, the axis of the fan having a conical inner end, a water cooling system, a pipe connection between the water cooling system and said fitting and extending transversely through the latter to supply moistened vapor to the fitting, said transversely extending pipe having an aperture close to and directly opposite the conical inner end of said axis spreading the moistened vapor in the fitting, and means for controlling the delivery of moistened vapor to the fitting.

3. In a device of the character described, a fitting open at opposite ends and adapted to be located in the pipe line between the carbureter and the intake manifold of a gas engine, a chamber in the fitting, a fan in the chamber, the axis of the fan having a conical inner end, a water cooling system, a pipe connection between the water cooling system and said fitting and extending transversely through the latter to supply moistened vapor to the fitting, said transversely extending pipe having an aperture close to and directly opposite the conical inner end of said axis, said conical inner end of the axis spreading the moistened vapor in the fitting, said transversely extending pipe constructed to convey air to said aperture therein for admixture with the moistened vapor, means for regulating the supply of the air, and means for controlling the delivery of moistened vapor to the fitting.

4. In a device of the character described, a fitting open at opposite ends and adapted to be located in the pipe line between the carbureter and the intake manifold of a gas engine, a chamber in the fitting, a fan in the chamber, the axis of the fan having a conical inner end, a water cooling system, a pipe connection between the water cooling system and said fitting and extending transversely through the latter to supply moistened vapor to the fitting, said transversely extending pipe having an aperture close to and directly opposite the conical inner end of said axis, said conical inner end of the axis spreading the moistened vapor in the fitting, said fitting having apertures leading through the fitting from said chamber into the intake manifold to relieve pressure in the chamber, and means for controlling the delivery of moistened vapor to the fitting.

5. In a device of the character described, a fitting adapted to be located in the pipe line between the carbureter and the intake manifold of a gas engine, a water cooling system for the engine including a radiator, a pipe line connecting the radiator above the water line of the latter and the fitting for the supply of moistened vapor to the fitting, a valve to control the delivery of moistened vapor from the radiator to said fitting, an air inlet to said fitting, a valve for controlling the delivery of air through the inlet to said fitting, and a plurality of fans rotatably mounted in said fitting to agitate the mixture in its passage from the carbureter to the engine, and a chamber in the fitting in which said fans are mounted, said fitting having apertures leading from said chamber into said pipe line to relieve pressure in the chamber.

6. In a device of the character described, a fitting open at opposite ends, a member bridging the opening at one end of the fitting and having an aperture therein, said fitting adapted to be located in a pipe line between the carbureter and the intake manifold of a gas engine, a radiator, an axis mounted in said bridging member and having a conical inner end, a pair of perforated fans mounted on said axis between the conical inner end thereof and said bridge member, a pipe connection between the radiator and the fitting and provided with an aperture opposite the conical end of the axis to supply moistened vapor to the fitting, said conical end of the axis spreading the moistened vapor in the fitting, and means for controlling the delivery of moistened vapor to the fitting.

7. In a device of the character described, a fitting adapted to be located in the pipe line between the carbureter and the intake manifold of a gas engine, said fitting having a chamber therein, a fan journaled in said chamber, a fitting having apertures leading from the chamber into said pipe line, to relieve the chamber of pressure incident to the operation of the fan, a radiator, a pipe extending transversely through the fitting, one end of said pipe adapted to receive air from the atmosphere, the other end of said pipe adapted to be connected to the radiator above the water line of the latter to supply moistened vapor to the fitting, said pipe having an aperture therein arranged in line with the longitudinal axis of the fitting whereby additional air and moistened vapor may be delivered to the fitting and whereby the vapor, air and gas may be thoroughly agitated and mixed in its passage from the carburetor to the engine.

In testimony whereof, I sign this specification in the presence of two witnesses.

ANGUS E. DETWILER.

Witnesses:
THOMAS E. HERRMAN,
JAMES J. MURPHY.